United States Patent
Kil et al.

[11] Patent Number: 6,029,464
[45] Date of Patent: Feb. 29, 2000

[54] DEHUMIDIFYING APPARATUS OF AIR CONDITIONER AND CONTROL METHOD THEREOF

[75] Inventors: Yong-Hyun Kil, Suwon; Sang-Bom Park, Hwaseong-gun, both of Rep. of Korea

[73] Assignee: Samsung Electronics Co., Ltd., Suwon, Rep. of Korea

[21] Appl. No.: 09/186,198

[22] Filed: Nov. 4, 1998

[30] Foreign Application Priority Data

Nov. 7, 1997 [KR] Rep. of Korea .................. 97-58786

[51] Int. Cl.⁷ ............................................. F25B 29/00
[52] U.S. Cl. .............................. 62/173; 62/93; 62/160; 62/324.1
[58] Field of Search ................... 62/173, 160, 180, 62/181, 228.4, 186, 176.6, 93, 324.1, 324.6

[56] References Cited

U.S. PATENT DOCUMENTS

| | | | |
|---|---|---|---|
| 3,006,613 | 10/1961 | Coyne | 257/290 |
| 3,779,031 | 12/1973 | Akiyama et al. | 62/160 |
| 4,182,133 | 1/1980 | Haas et al. | 62/93 |
| 5,081,846 | 1/1992 | Dudley et al. | 62/115 |
| 5,303,561 | 4/1994 | Bahel et al. | 62/186 |
| 5,305,822 | 4/1994 | Kogetsu et al. | 165/12 |
| 5,355,323 | 10/1994 | Bae | 364/505 |
| 5,465,588 | 11/1995 | McCahill et al. | 62/127 |
| 5,605,053 | 2/1997 | Otori | 62/180 |

Primary Examiner—Henry Bennett
Assistant Examiner—Marc Norman
Attorney, Agent, or Firm—Burns, Doane, Swecker & Mathis, L.L.P.

[57] ABSTRACT

A dehumidifying apparatus of an air conditioner and a control method thereof by which a heating/dehumidifying operation is performed when a room temperature is lowered. When the room temperature reaches a predetermined temperature, the air conditioner is switched to a cooling operation to perform a heating/dehumidifying operation, so that heating and cooling operations are inter-switched according to changes of room temperature to keep the room temperature from dropping and to improve dehumidifying efficiency according to increased temperature of the indoor heat exchanger, the apparatus comprising: a four-way valve for changing flow of coolant to thereby transform a cooling cycle to a heating cycle; room temperature detecting unit for detecting a room temperature; outdoor temperature detecting unit for detecting an outdoor temperature; and a control unit for controlling drive of the four-way valve according to the room temperature detected by the room temperature detecting unit when the outdoor temperature detected by the outdoor temperature detecting unit is above a predetermined temperature to thereby switch to cooling/heating and to controllably drive the compressor, the outdoor fan and the indoor fan according to the cooling/heating switch.

8 Claims, 12 Drawing Sheets

FIG. 8

| CLASSI-FICATION | COOLING | DEHUMI-DIFICATION | | HEATING | | HEATING 2 | HEATING/DEHUMIDIFICATION | | | A DOMAIN | B DOMAIN |
|---|---|---|---|---|---|---|---|---|---|---|---|
| | | OPER-ATION | DETEC-TION | HEATING 1 | DETEC-TION | | H STOP | C STOP | COOLING | | |
| INDOOR FAN | STRONG | WEAKEST | OFF | STRONG | WEAKEST | OFF | WEAKEST | WEAKEST | OFF | WEAKEST | OFF |
| OUTDOOR FAN | ON | ON | OFF | ON | OFF | OFF | OFF | OFF | ON | OFF | OFF |
| FOUR-WAY VALVE | ON | ON | OFF | ON | OFF | ON | ON | OFF | ON | OFF | OFF |
| COMPRESSOR | OFF | OFF | OFF | ON | ON | ON | ON | OFF | OFF | OFF | OFF |

DEHUMIDIFYING APPARATUS OF AIR CONDITIONER AND CONTROL METHOD THEREOF

BACKGROUND OF THE INVENTION

1. Field of the Invention

The present invention relates to an air conditioner, and more particularly to a dehumidifying apparatus of an air conditioner and a control method thereof by which cooling and heating are changed according to room and outdoor temperature without dropping the room temperature but only removing humidity.

2. Description of the Prior Art

Generally, an air conditioner is classified into various kinds according to function and unit construction, where the air conditioner can be classified according to function into: (a) selective heating and cooling, (b) cooling and dehumidifying, (c) heating only or (d) cooling only, and can be classified according to unit construction into: (a) an integral type to be installed at a window and the like for integral cooling and radiating purpose, or (b) a separation type comprised of a cooling apparatus disposed inside a room and a radiating and a compressing apparatus disposed outside.

The separation type of air conditioner typically includes a multi-purpose type comprised of one outdoor unit and more than two indoor units for air conditioning a plurality of room spaces.

This separation type air conditioner is provided, as illustrated in FIG. 1, with one indoor unit 10, and an outdoor unit 20, both being operated in one system and selectively operated for either cooling or heating, according to need.

The outdoor unit 20 includes a compressor 30, an outdoor heat exchanger 40, a capillary tube 50, and an indoor heat exchanger 60.

The indoor heat exchanger 60 includes an inlet distributer 70, outlet consolidator 80 and first, second and third coolant lines 61, 62 and 63.

The first, second and third coolant lines 61, 62 and 63 have respective coolant inlets 61a, 62a and 63a and respective coolant outlets 61b, 62b and 63b, where the coolant outlets 61b, 62b and 63b are connected to respective outlet dividers 74, 75 and 76 and coolant flowing in the respective outlet dividers 74, 75 and 76 forms a coolant cycle.

In the air conditioner thus constructed, a coolant cycle is formed as shown by solid arrows in FIG. 1, which coolant cycle is the same for both a cooling operation and a dehumidifying operation.

First of all, when gaseous coolant of high temperature and high pressure discharged out of the compressor 30 at the outdoor unit 20 is infused into the outdoor heat exchanger 40, the outdoor heat exchanger 40 forcibly cools and condenses the gaseous coolant, and liquefied coolant of low temperature and high pressure condensed by the outdoor heat exchanger 40 is infused into the capillary tube 50.

The liquefied coolant infused into the capillary tube 50 is expanded to frostless coolant of low temperature and low pressure and is conducted to the heat exchanger 60 and evaporated, where the coolant removes heat from the air blown by an indoor fan to cool the room air. The cool air is discharged indoors to perform cooling or dehumidifying operations. The gaseous coolant of low pressure and low temperature cooled by the indoor heat exchanger 60 is again infused into the compressor 30 to be changed into coolant gas of high pressure and high temperature and repeats coolant cycle thus described.

The indoor unit 10 drives the indoor fan at a speed according to an air amount established by a user to thereby perform a cooling operation, but reduces the air speed of the indoor fan when performing a dehumidifying operation.

However, there is a problem in a conventional dehumidifying operation method thus described in that a user feels much colder due to lower room temperature during a dehumidifying operation in the rainy season when it is humid and the dehumidifying efficiency is reduced due to much lower temperature at the indoor heat exchanger 60.

Still worse, the room temperature cannot be upwardly adjusted because the room temperature cannot be established by the user during the conventional dehumidifying operation, even though the user wishes to perform the dehumidifying operation at increased room temperature.

SUMMARY OF THE INVENTION

The present invention is disclosed to solve the aforementioned problem and it is an object of the present invention to provide a dehumidifying apparatus of an air conditioner and a control method thereof by which a heating/dehumidifying operation is performed when a room temperature is lowered by being transformed into heating operation, and when the room temperature reaches a predetermined temperature, the air conditioner is switched to cooling operation to perform a heating/dehumidifying operation, so that heating and cooling operations are inter-switched according to changes of room temperature to keep the room temperature from dropping and to improve dehumidifying efficiency according to increased temperature of the indoor heat exchanger.

In accordance with one object of the present invention, there is provided a dehumidifying apparatus of an air conditioner which forms a cooling cycle by way of a compressor, and outdoor heat exchanger, a capillary tube and an indoor heat exchanger, the apparatus comprising:

a four-way valve for changing flow of coolant to thereby transform a cooling cycle to a heating cycle;

room temperature detecting means for detecting a room temperature;

outdoor temperature detecting means for detecting an outdoor temperature; and control means for controlling drive of the four-way valve according to the room temperature detected by the room temperature detecting means when the outdoor temperature detected by the outdoor temperature detecting means is above a predetermined temperature to thereby switch to cooling/heating and to controllably drive the compressor, the outdoor fan and the indoor fan according to the cooling/heating switch.

In accordance with another aspect of the present invention, there is provided a dehumidifying control method of an air conditioner, the method comprising the steps of:

detecting an outdoor temperature to discriminate whether the outdoor temperature is above a predetermined temperature;

detecting a room temperature when the outdoor temperature is above the predetermined temperature as a result of the above temperature discrimination to compare same with a previously established temperature;

performing a heating operation and a heating/dehumidifying operation according to the established temperature when the established temperature is larger than the room temperature as a result of the above temperature comparison(first operation step); and performing a cooling operation, a dehumidifying operation and a heating/dehumidifying operation when the established temperature is below the room temperature as a result of the above temperature comparison(second operation step).

BRIEF DESCRIPTION OF THE DRAWINGS

For a fuller understanding of the nature and objects of the invention, reference should be made to the following detailed description taken in conjunction with the accompanying drawings in which:

FIG. 8 is a driving load constitutional diagram for each domain in an air conditioner according to the present invention.

DETAILED DESCRIPTION OF THE INVENTION

The preferred embodiment of the present invention will now be described in detail with reference to accompanying drawings.

Figure 1:
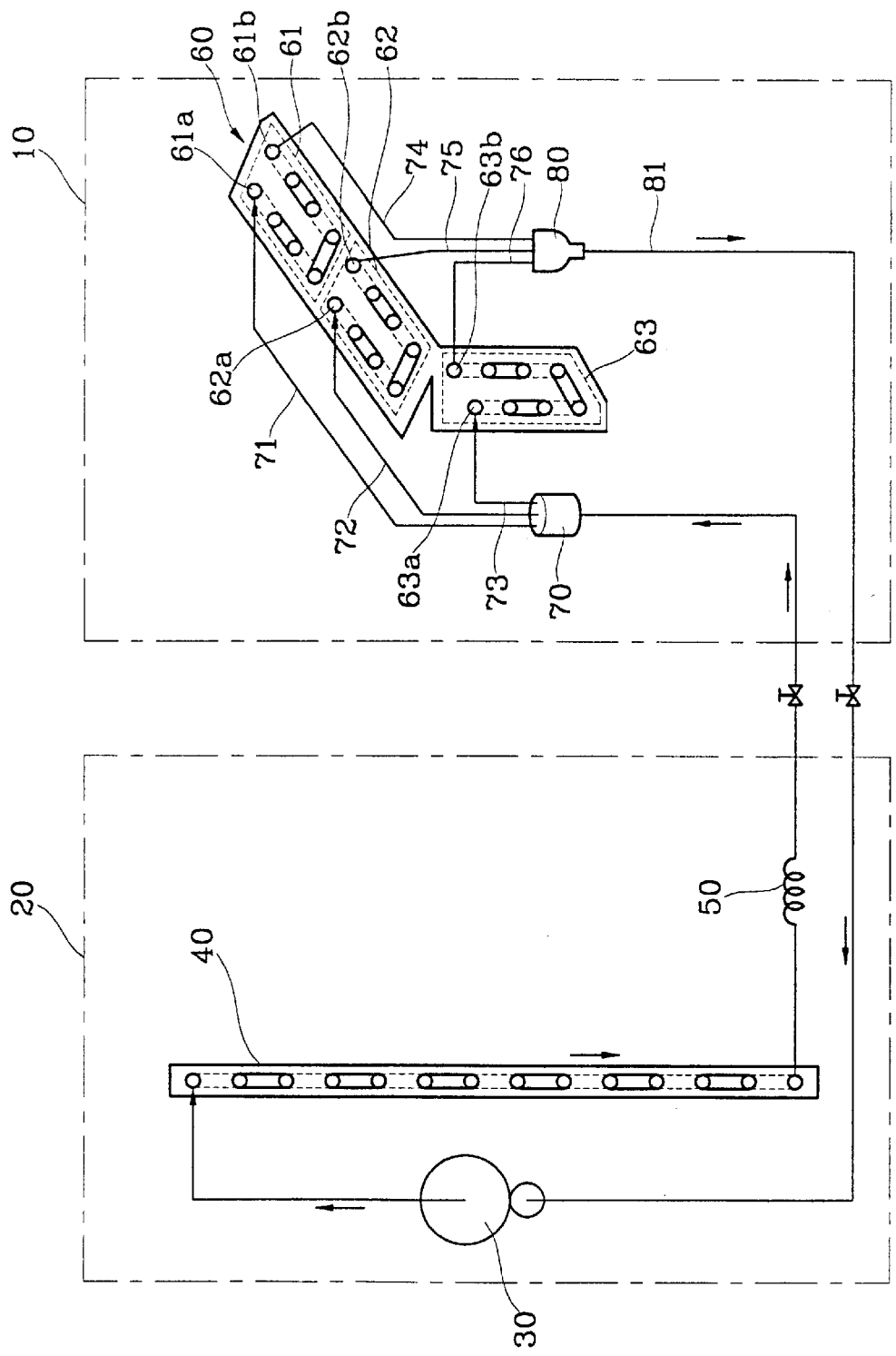
FIG. 1 is a schematic diagram for illustrating a coolant cycle in an air conditioner according to the prior art.
Figure 2:
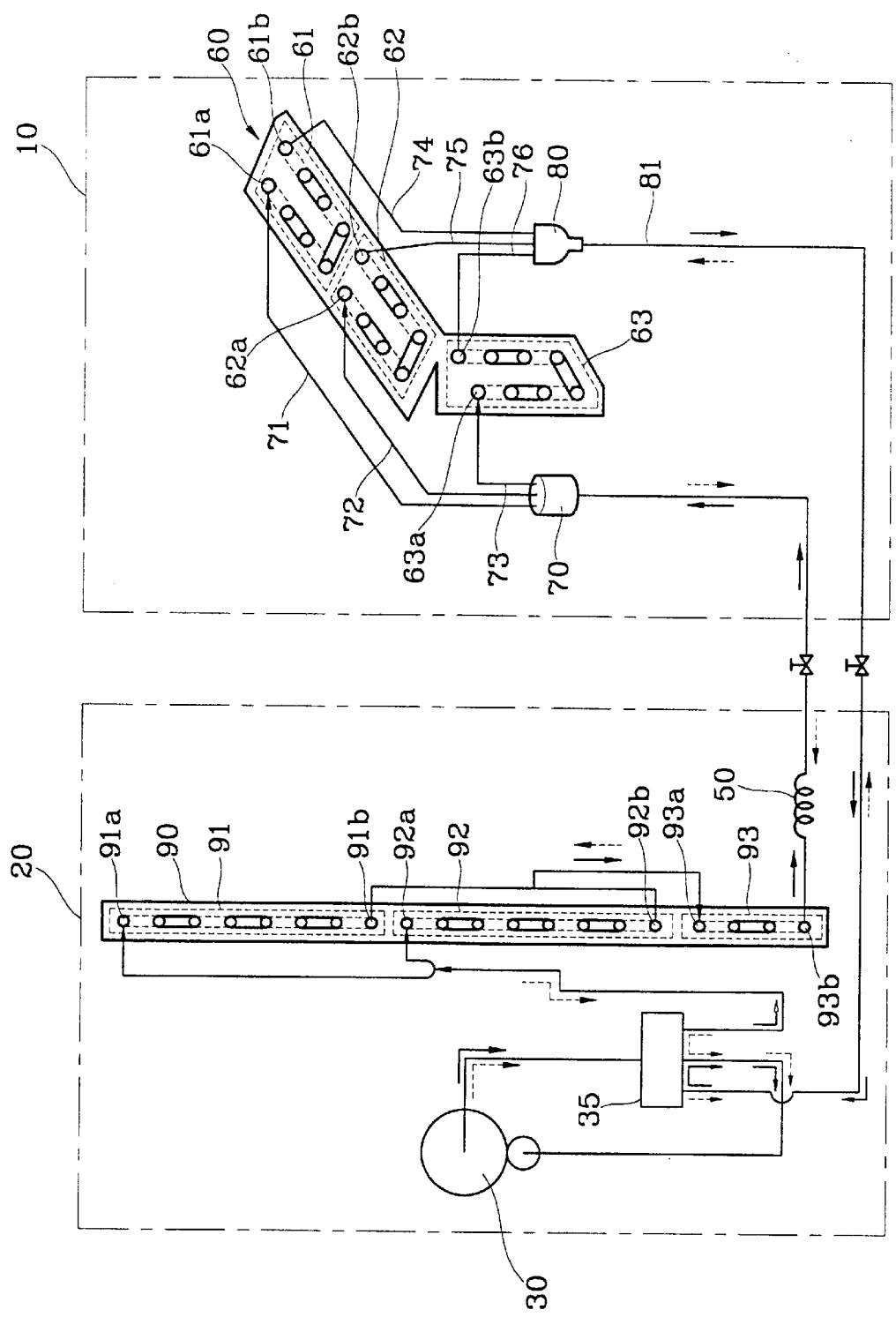
FIG. 2 is a schematic diagram for illustrating a coolant cycle in an air conditioner according to the present invention.

FIG. 2 is a schematic diagram for illustrating a coolant cycle in an air conditioner according to the present invention and throughout the drawings, like reference numerals and symbols are used for designation of like or equivalent parts or portions.

As illustrated in FIG. 2, in an air conditioner equipped with an indoor unit 10 and an outdoor unit 20, the outdoor unit 20 includes a compressor 30, a four-way valve 35, an outdoor heat exchanger 90 and a capillary tube 50. The outdoor heat exchanger 90 is provided with first, second and third coolant lines 91–93. The first, second and third coolant lines 91, 92 and 93 are arranged with respective coolant inlets 91a, 92a and 93a and with respective coolant outlets 91b, 92b and 93b.

Furthermore, the indoor unit 10 is provided with an indoor heat exchanger 60, which is in turn provided with an inlet distributor 70 at one side thereof and with an outlet consolidator 80 at the other side thereof. The indoor heat exchanger 60 is provided with first, second and third coolant lines 61, 62 and 63, which in turn include respective coolant inlets 61a, 62a and 63a and respective coolant outlets 61b, 62b and 63b.

The coolant outlets 61b, 62b and 63b are connected to respective outlet distributors 74, 75 and 76 and coolant flowing in the outlet distributors 74, 75 and 76 flows through the consolidator 80 and into a connecting pipe 81 and forms a coolant cycle flowing into the compressor 30.

Coolant cycles during a cooling operation and a heating operation are shown by solid arrows and dotted arrows, respectively, in FIG. 2.

First of all, during the cooling operation, the four-way valve 35 is turned to a cooling or off position to form a coolant cycle shown by solid arrows in FIG. 2, where the gaseous coolant of high pressure and high temperature discharged from the compressor 30 at the outdoor unit 20 flows to coolant inlets 91a and 92a via the first and the second coolant lines 91 and 92 from the four-way valve 35 to thereafter be discharged to the coolant outlets 91b and 92b.

The coolant from the first and second coolant lines 91 and 92 flows to the coolant inlet 93a via the third coolant line 93 to thereafter be discharged to the coolant outlet 93b.

The outdoor heat exchanger 90 serves to heat-exchange the gaseous coolant with air blown by an outdoor fan, to forcibly cool and condense the same, and the liquefied coolant of low temperature and low pressure condensed by the outdoor heat exchanger 90 is infused into the capillary tube 50.

The liquefied coolant of low temperature and high pressure infused into the capillary tube 50 is expanded to frostless coolant of low temperature and low pressure and conducted to the indoor heat exchanger 60 to be gasified. The frostless coolant now removes heat from the air blown by the indoor fan to cool the room air. The cooled air (cool air) is discharged indoors to perform a cooling operation.

The gaseous coolant of low pressure and low temperature cooled by the indoor that exchanger 60 is again infused into the compressor 30 and is changed into coolant gas of high pressure and high temperature to repeat the coolant cycle thus described.

Meanwhile, during a heating operation, the four-way valve 35 is turned to a heating or on position to form a coolant cycle shown by dotted arrows in FIG. 2. The gaseous coolant of high pressure and high temperature discharged from the compressor 30 at the outdoor unit 20 is discharged to the inlet distributors 71, 72 and 73 via the first, second and third coolant lines 61, 62 and 63 and condensed in the heat exchanger 60, at which time, the air blown by the indoor fan is heat-exchanged by room temperature cooling water or air and the coolant is cooled to room temperature and high pressure to be discharged indoors as warmed-up air(warm air) for performance of the heating operation.

The coolant liquefied by the indoor heat exchanger 60 is reduced in pressure and expanded to a frostless and evaporative coolant of low pressure and low temperature to thereafter be infused into the third coolant line 93 of the outdoor heat exchanger 90. The coolant from the third coolant line 93 is discharged into the first and second coolant lines 91 and 92 at the outdoor heat exchanger 90.

The outdoor heat exchanger 90 serves to heat-exchange the frostless coolant of low pressure and low temperature by the air blown by the indoor fan and to cool the same.

The gaseous coolant of low pressure and low temperature cooled by the outdoor heat exchanger 90 is again infused into the compressor 30 via the four-way valve 35 to be converted into coolant gas of high pressure and high temperature and repeats the coolant cycle thus described.

Now, a circuit block diagram for controlling a dehumidifying operation of an air conditioner for performing the cooling/heating functions according to the coolant cycle will be described with reference to FIG. 3.

Figure 3:
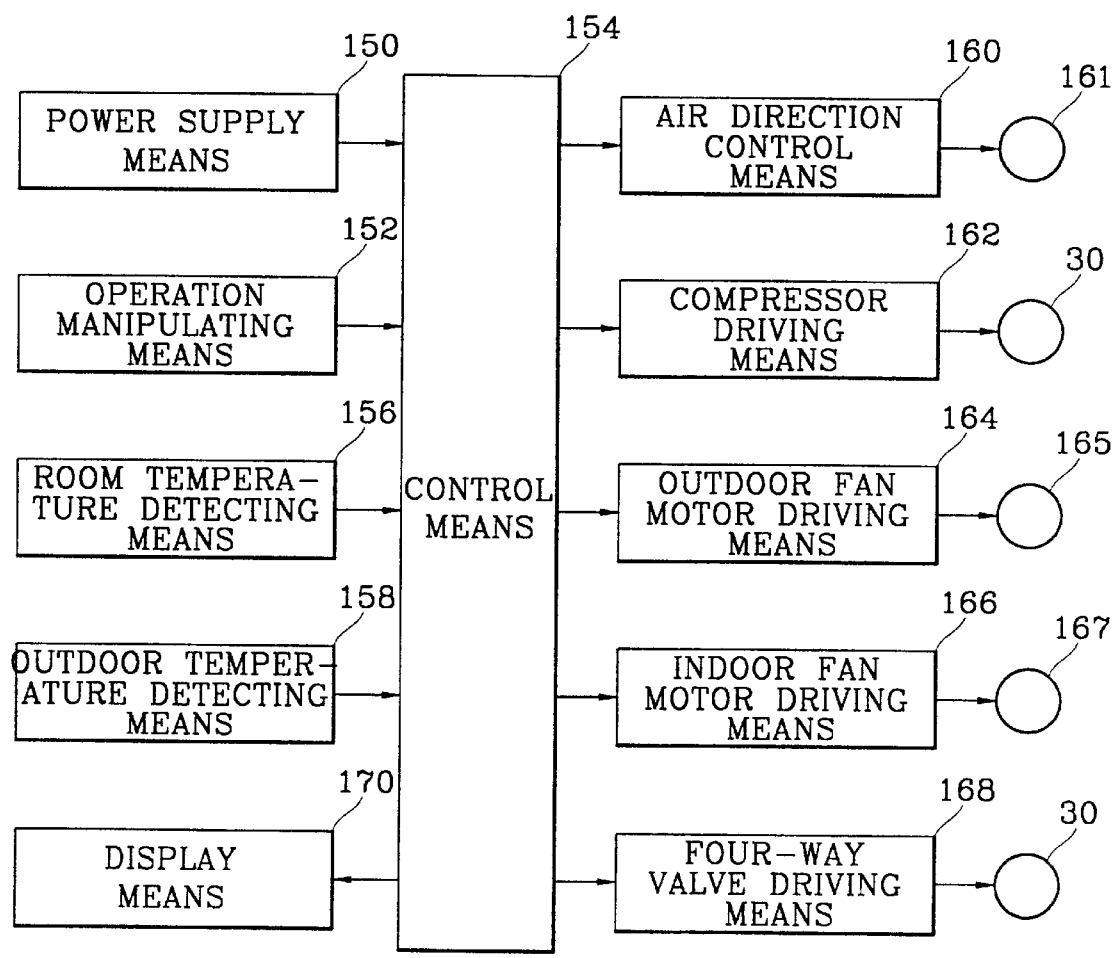
FIG. 3 is a control block diagram of a dehumidifying apparatus in an air conditioner according to one embodiment of the present invention.
Figure 4A:
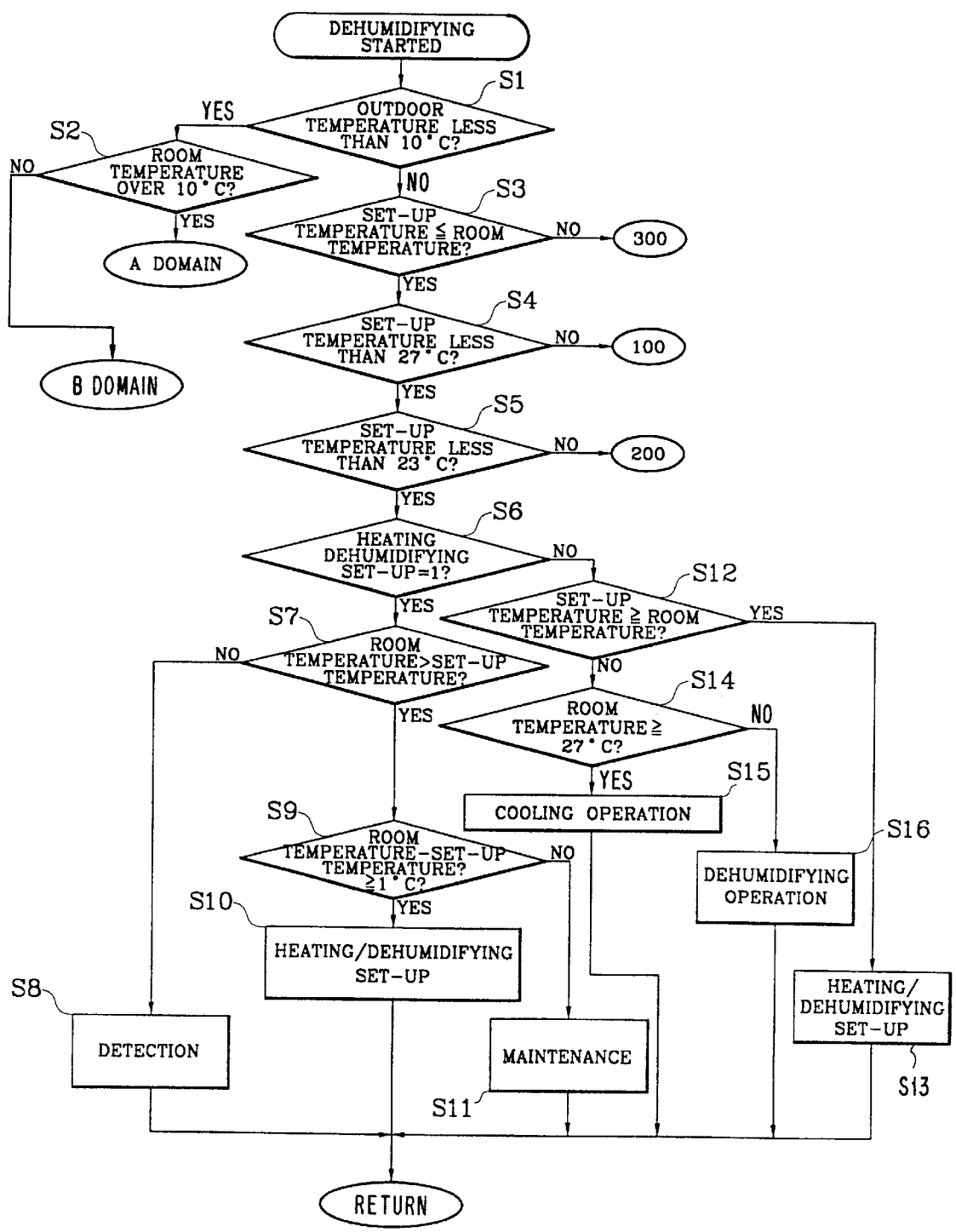
FIGS. 4A through 4E are flow charts for illustrating a dehumidifying control apparatus of an air conditioner according to the present invention.
Figure 4B:
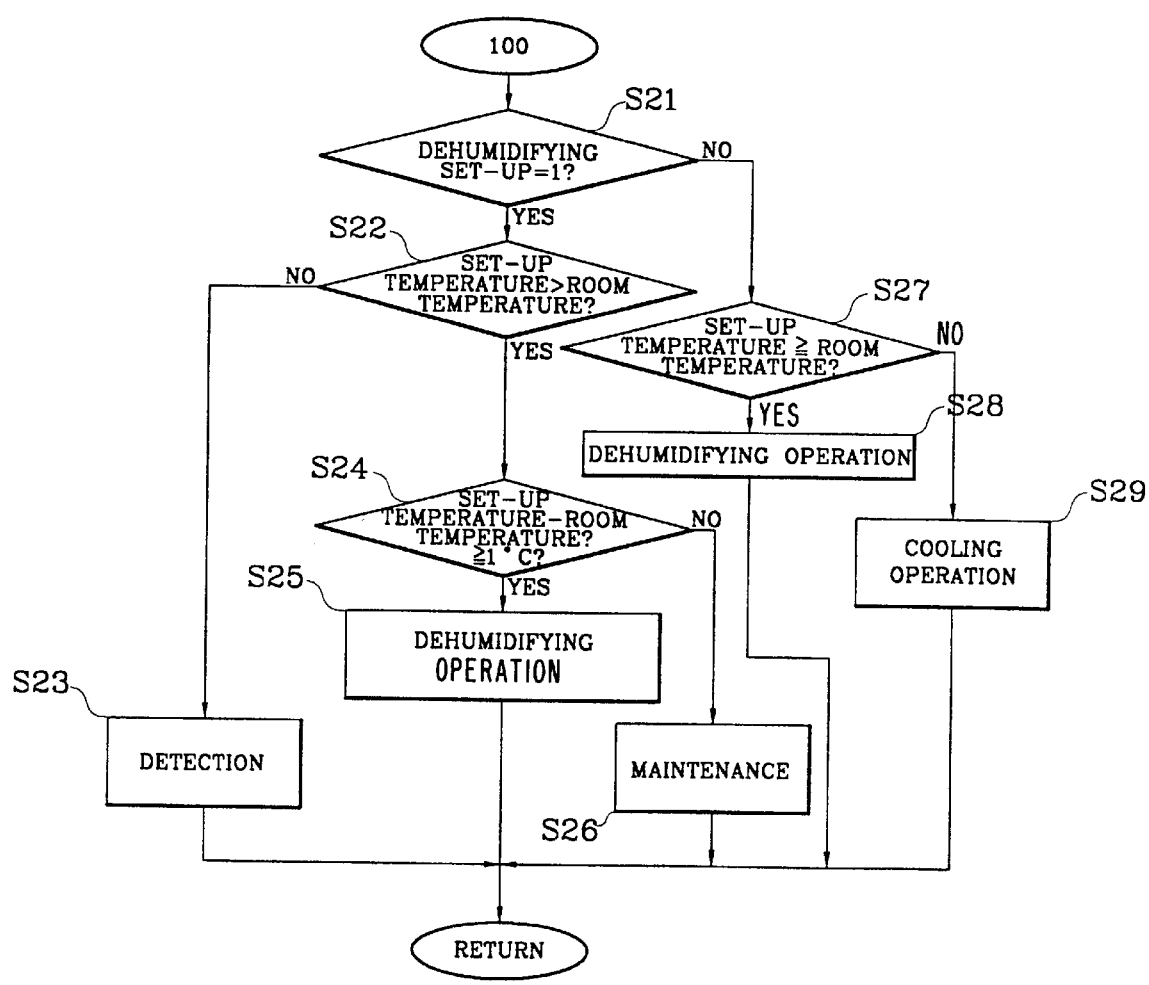
Figure 4C:
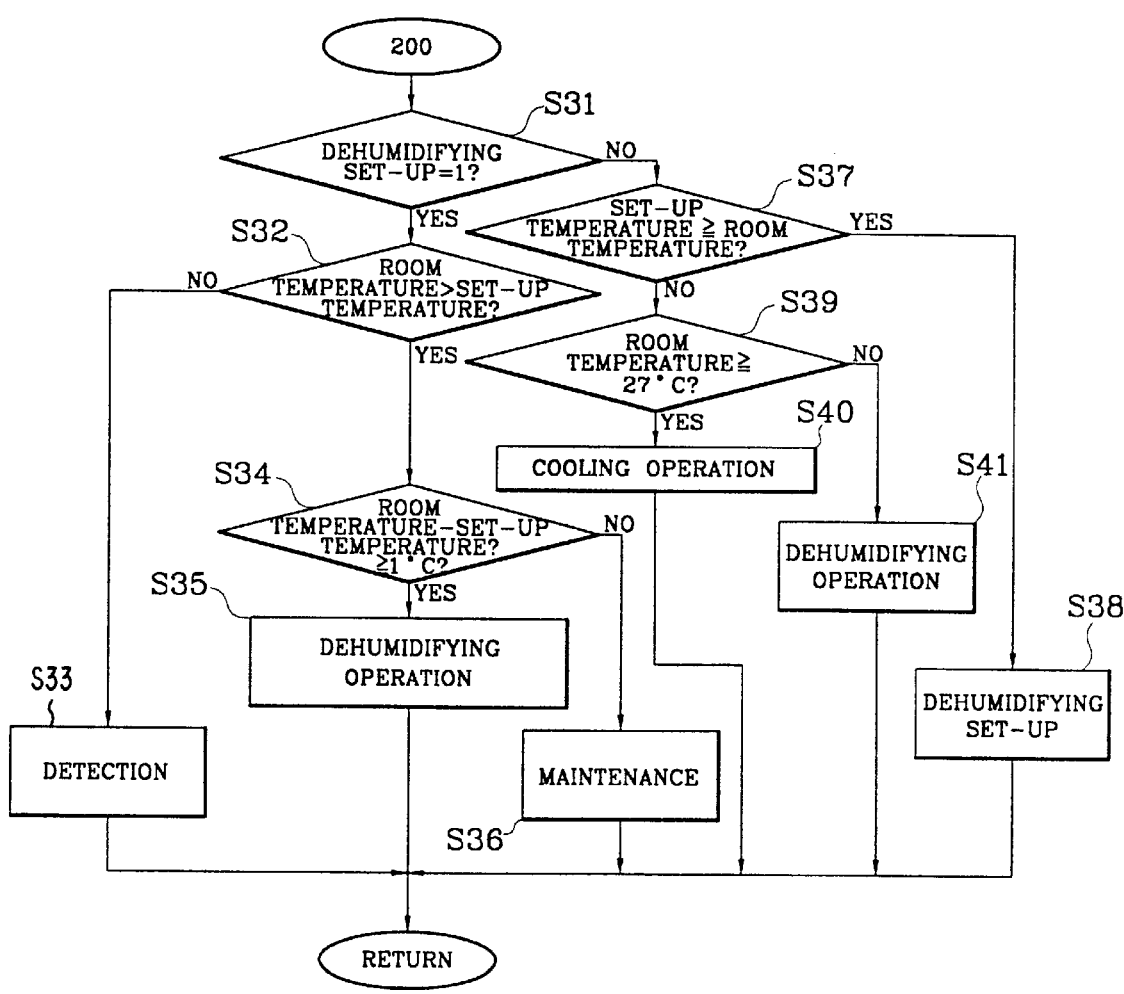
Figure 4D:
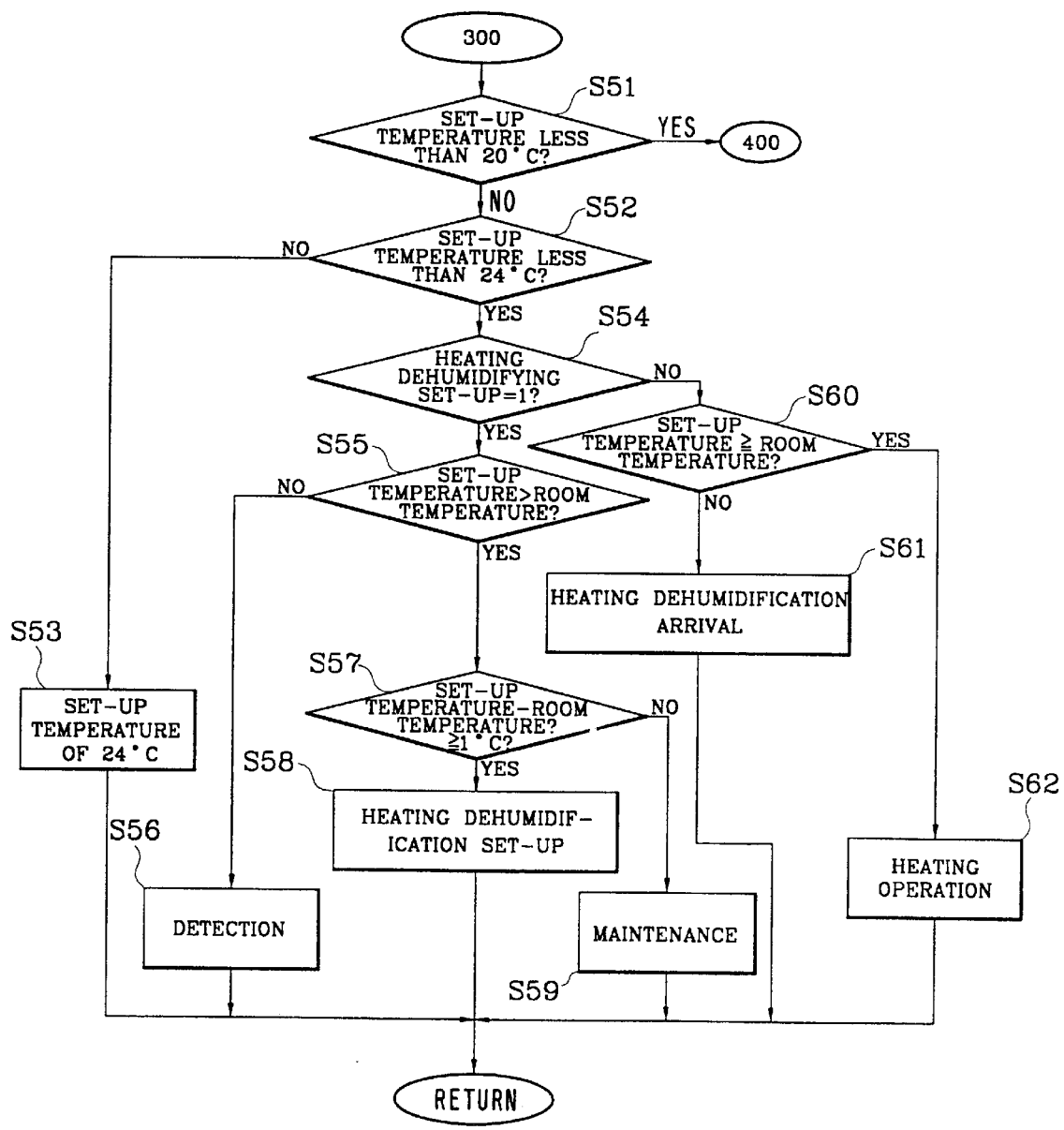
Figure 4E:
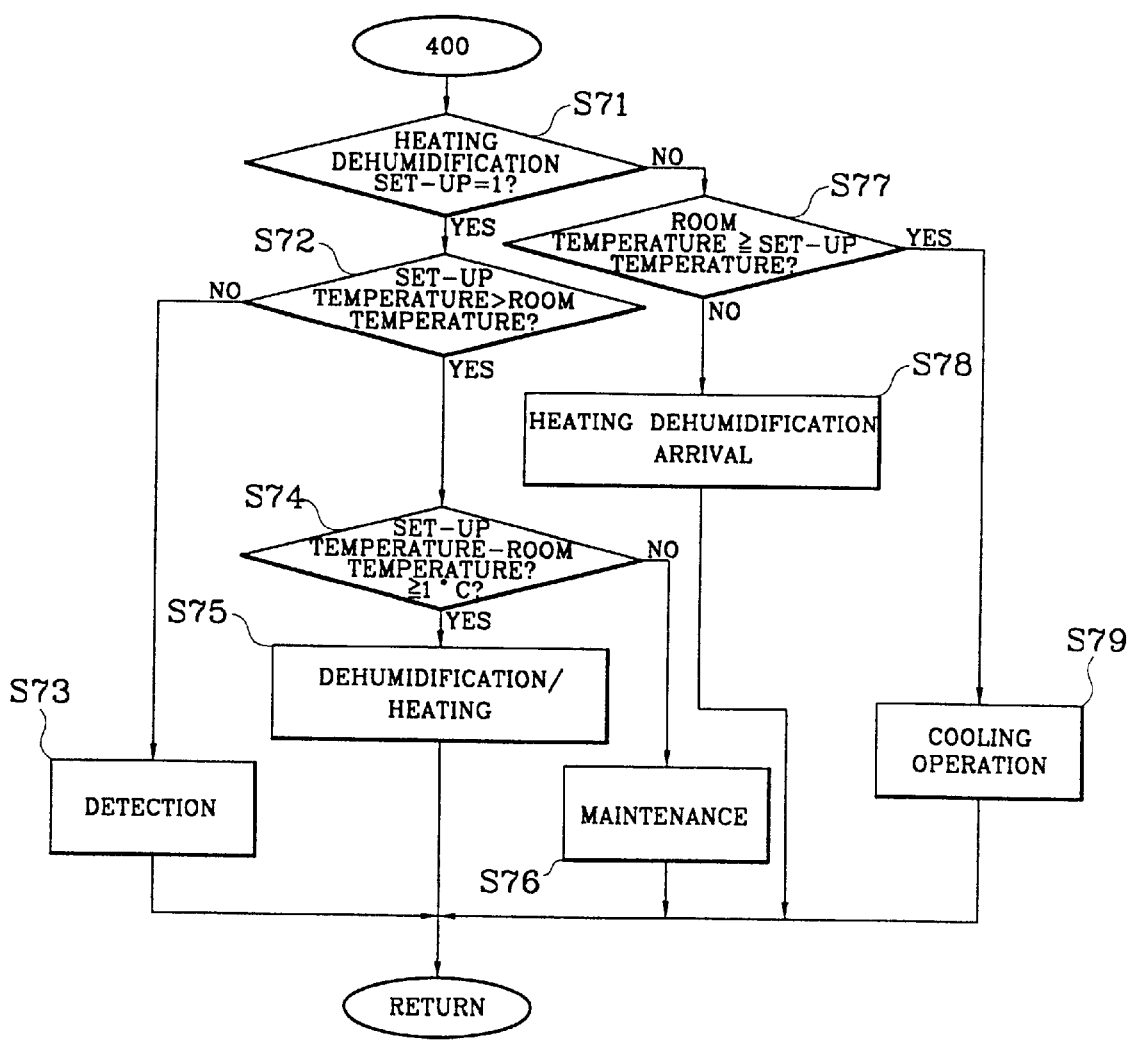

As illustrated in FIG. 3, power supply means 150 converts the commercial alternating current AC voltage supplied from an AC power supply terminal (not shown) to a direct current DC voltage necessary for operation of an air conditioner and outputs the same. Manipulating means 152 is provided with a plurality of function keys for selecting operation modes (automatic, cooling, dehumidifying, blowing, heating, etc), amount of air discharged via discharge outlet 7 (strong wind, weak wind, breeze, etc) and desired temperature (Ts: hereinafter referred to as established temperature), and is also provided with an operation key in order to input an operation start signal and an operation stop signal of the air conditioner.

Furthermore, control means 154 is a microcomputer which receives the DC voltage output from the power supply means 150 to initialize the air conditioner and controls the overall operation of the air conditioner according to an operation selecting signal input by the operation manipulating means 152.

The control means 154 controls during a dehumidifying operation the drives of the compressor 30, outdoor fan 165, indoor fan 167 and the four-way valve 35 according to the room temperature and outdoor temperature to alternatively perform the cooling and heating operation or the heating operations.

Room temperature detecting means 156 controls the room temperature according to the temperature (Ts) established by a user via the operation manipulating means 152 to detect a temperature (Tr) of room air sucked into the indoor unit 10 in order to perform a cooling operation and a heating operation, and outdoor temperature detecting means 158 detects an outdoor temperature (To) to output same to the control means 154.

Furthermore, air direction control means controllably drives an air direction motor 161 for horizontally and vertically controlling the directions of the discharged air so that the air heat-exchanged by the indoor heat exchanger 60 can be evenly and equally dispersed to entire areas of the room.

Compressor driving means 162 receives a control signal output from the control means 154 to drive the compressor 30 according to a difference between the room temperature (Tr) and the established temperature (Ts).

Outdoor fan motor driving means 164 receives a control signal output from the control means 154 according to a difference between the room temperature (Tr) and the established temperature (Ts) to control a speed of outdoor fan motor and to controllably drive outdoor fan 165. Indoor fan motor driving means 166 receives a control signal output from the control means 154 according to an air amount established by the user according to the operation manipulating means 152 to control a speed of the indoor fan motor so as to blow indoors the air (cool air or warm air) exchanged by the indoor heat exchanger 60.

Four-way valve driving means 168 receives a control signal output from the control means 154 to controllably drive the four-way valve 35 so as to change a flow direction of the coolant according to operating conditions (cooling or heating) input by the operation manipulating means 152, and display means 170 displays the operation selection modes (automatic, cooling, dehumidifying, blowing, heating, etc.) input by the operation manipulating mean 152 according to control of the control means 154 and also displays an operational status of the air conditioner.

Now, a dehumidifying control method of an air conditioner thus constructed will be described in detail according to FIGS. 4A through 4E, where a symbol S denotes steps.

First, when a power is applied to an air conditioner, the power supply means 150 converts the commercial AC voltage supplied from an AC power supply terminal (not shown) to a DC voltage necessary for driving the air conditioner and outputs same to respective driving circuits and the control means 154.

Successively, the DC voltage output from the power supply means 150 is received by the control means 154 to initialize the air conditioner.

At this time, when the operation modes (by way of example, dehumidifying), established temperature (Ts) and the like desired by the user are input, operation selection signal and operation start signal corresponding to the dehumidifying mode is input from the operation manipulating means 152 to the control means 154 to start the dehumidifying mode.

Successively, at step S1, outside temperature (To) is detected by the outside temperature detecting means 158 and the control means 154 receives an analogue data of the outside temperature (To) to convert same to digital data and discriminates whether the outside temperature (To) is below 10 degrees Celsius.

As a result of the discrimination at step S1, if the outside temperature (To) is below 10 degrees Celsius (in case of YES), flow proceeds to step S2, where the room temperature (Tr) is detected by the room temperature detecting means 156 and the control means 154 receives an analogue data of the room temperature (Tr) detected by the room temperature detecting means 156 to convert same to a digital data and discriminates whether the room temperature (Tr) is above 10 degrees Celsius.

As a result of the discrimination at step S2, if the room temperature (Tr) is above 10 degrees Celsius (in case of YES), the outdoor fan 165, compressor 30 and the four-way valve 35 are rendered inactive, as illustrated in FIG. 8, flow advances to A domain for driving a "weakest wind" (When established wind amount of the indoor fan is presumed as "strong wind", "intermediate wind" and "weak wind", the "weakest wind" is defined as the wind amount weaker than the weak wind.), and if the room temperature (Tr) is not above 10 degrees Celsius (in case of NO), flow proceeds to B domain where the indoor fan 167, outdoor fan 165, compressor 30 and the four-way valve 35 are all rendered inactive, as illustrated in FIG. 8.

Meanwhile, as a result of the discrimination at step S1, if the outdoor temperature (Ts) is not below 10 degrees Celsius, flow advances to step S3 to discriminate whether the established temperature (Ts) is below the room temperature (Tr), and if the established temperature (Tr) is below the room temperature (Tr) (in case of YES), flow proceeds to step S4 to discriminate whether the established temperature (Ts) is below 27 degrees Celsius.

As a result of the discrimination at step S4, if the established temperature (Ts) is below 27 degrees Celsius (in case of YES), flow advances to step S5 to discriminate whether the established temperature (Ts) is below 23 degrees Celsius, and if the established temperature (Ts) is below 23 degrees (in case of YES), flow proceeds to step S6, and discriminates whether a heating/dehumidifying set-up (which is always set up at zero) is zero or 1.

As a result of the discrimination at step S6, if the heat/dehumidifying set-up is 1 (in case of YES), flow proceeds to step S7 to discriminate whether the room temperature (Tr) is larger than the established temperature (Ts). If the room temperature (Tr) is not larger than the established temperature (Ts) (in case of NO), flow advances to step S8 to turn off the outdoor fan 165 and the compressor 30 and to turn on the four-way valve 35. The control means 154 now performs a detecting operation at heating for driving the indoor fan 167 at the "weakest wind" and returns.

As a result of the discrimination at step S7, if the room temperature (Tr) is larger than the established temperature (Ts) (in case of YES), flow advances to step S9 to discriminate whether a difference between the room temperature (Tr) and the established temperature (Ts) is beyond 1 degree Celsius (in case of YES). If the difference is beyond 1 degree Celsius (in case of YES), flow proceeds to step S10, as illustrated in FIG. 6 (because it is an operation pattern corresponding to a heating/humidifying mode where the established temperature (Ts) is below 23 degrees Celsius and the difference between Ts and Tr is beyond 1 degree Celsius) to exercise heating/dehumidifying set-up and to return.

Figure 6:
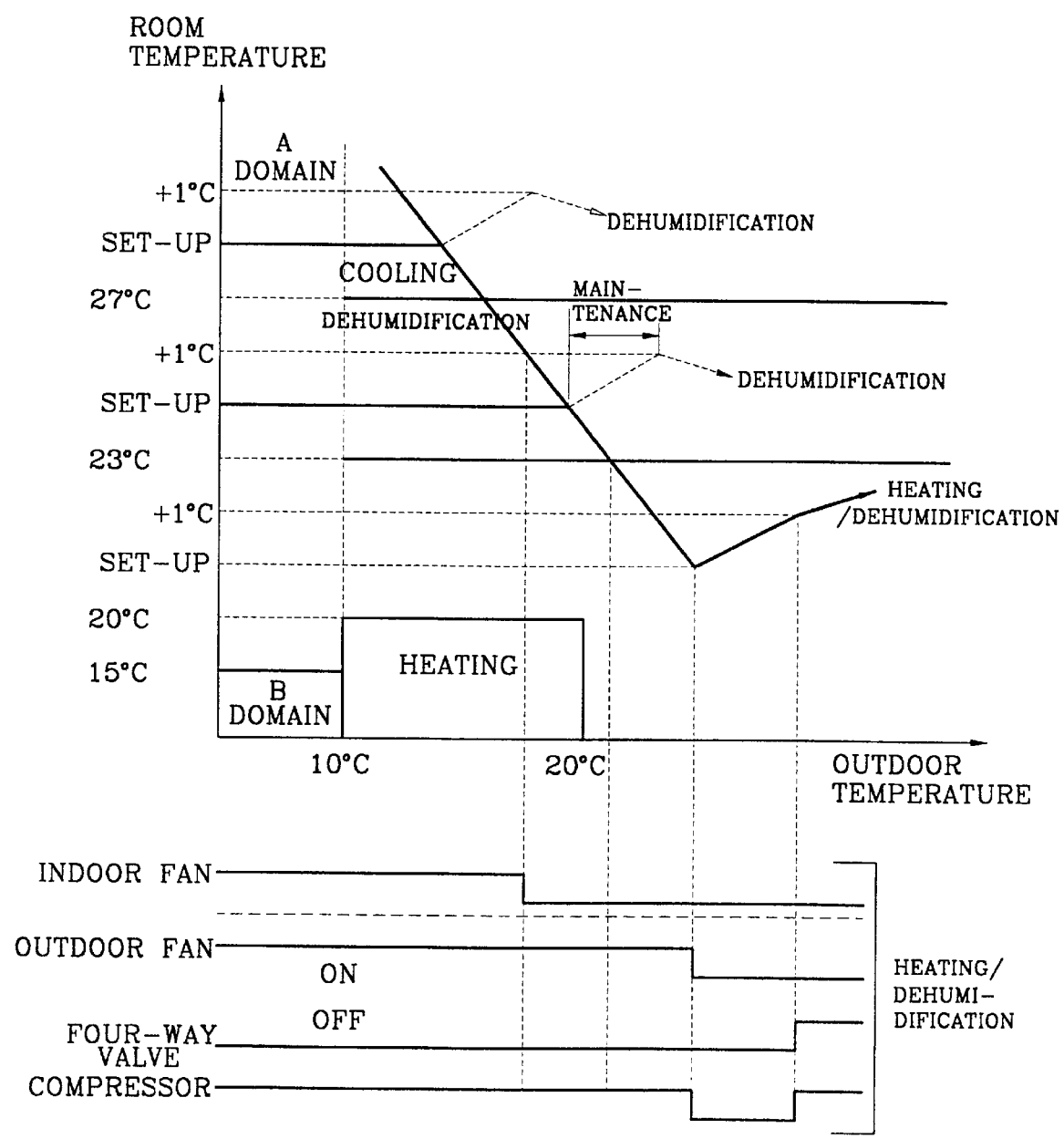
FIG. 6 is an operation pattern domain diagram of an air conditioner according to the present invention when an established temperature is below a room temperature.

As a result of the discrimination at step S9, if the difference between Tr and Ts is not beyond 1 degree Celsius (in case of NO), flow advances to step S11 to maintain the current status and return, as illustrated in FIG. 6 (because it is an operation pattern corresponding to a state where the established temperature (Ts) is below 23 degrees Celsius at Tr/Ts and the difference between Tr and Ts is below 1 degree Celsius).

Meanwhile, as a result of the discrimination at step S6, if the heating/dehumidifying set-up is not 1 and is instead zero (in case of NO), flow advances to step S12 to discriminate whether Ts is above Tr and if Ts is above Tr (in case of YES), flow proceeds to step S13 to perform the heating/ dehumidifying set-up and to return.

As a result of the discrimination at step S12, if the Ts is above Tr (in case of NO), flow proceeds to step S14 to discriminate whether Tr is above 27 degrees Celsius.

If the Tr is above 27 degrees Celsius (in case of YES), flow advances to step S15 as illustrated in FIG. 6 (because it corresponds to an operation pattern of cooling where Ts is below 23 degrees Celsius at Ts/Tr and Tr and Tr is above 27 degrees Celsius) to drive the indoor fan 167 at "strong wind", to turn on the outdoor fan 165 and the compressor 30, to turn off the four-way valve 35 for cooling operation and to return, as illustrated in FIG. 8.

As a result of the discrimination at step S14, if the Tr is not above 27 degrees Celsius (in case of NO), flow advances to step S16 (because it corresponds to an operation pattern of dehumidifying where Ts is below 23 degrees Celsius at Ts<Tr and Tr is below 27 degrees Celsius) to drive the indoor fan 167 at the weakest wind, to turn on the outdoor fan 165 and the compressor 30, to turn off the four-way valve 35 for dehumidifying operation and to return.

Meanwhile, as a result of the discrimination at step S4, if the Ts is not below 27 degrees Celsius (in case of NO), flow advances to step S21 to discriminate whether the dehumidifying set-up (which is always set up at zero) is zero or 1.

If the dehumidifying set-up is I (in case of YES), flow proceeds to step S22 to discriminate whether Ts>Tr. If the Ts is not larger than Tr (in case of NO), flow advances to step S23 to deactivate the outdoor fan 165, the compressor 30 and the four-way valve 35, to drive the indoor fan 167 at the weakest wind for performing a detecting operation at dehumidifying and to return.

Figure 5:
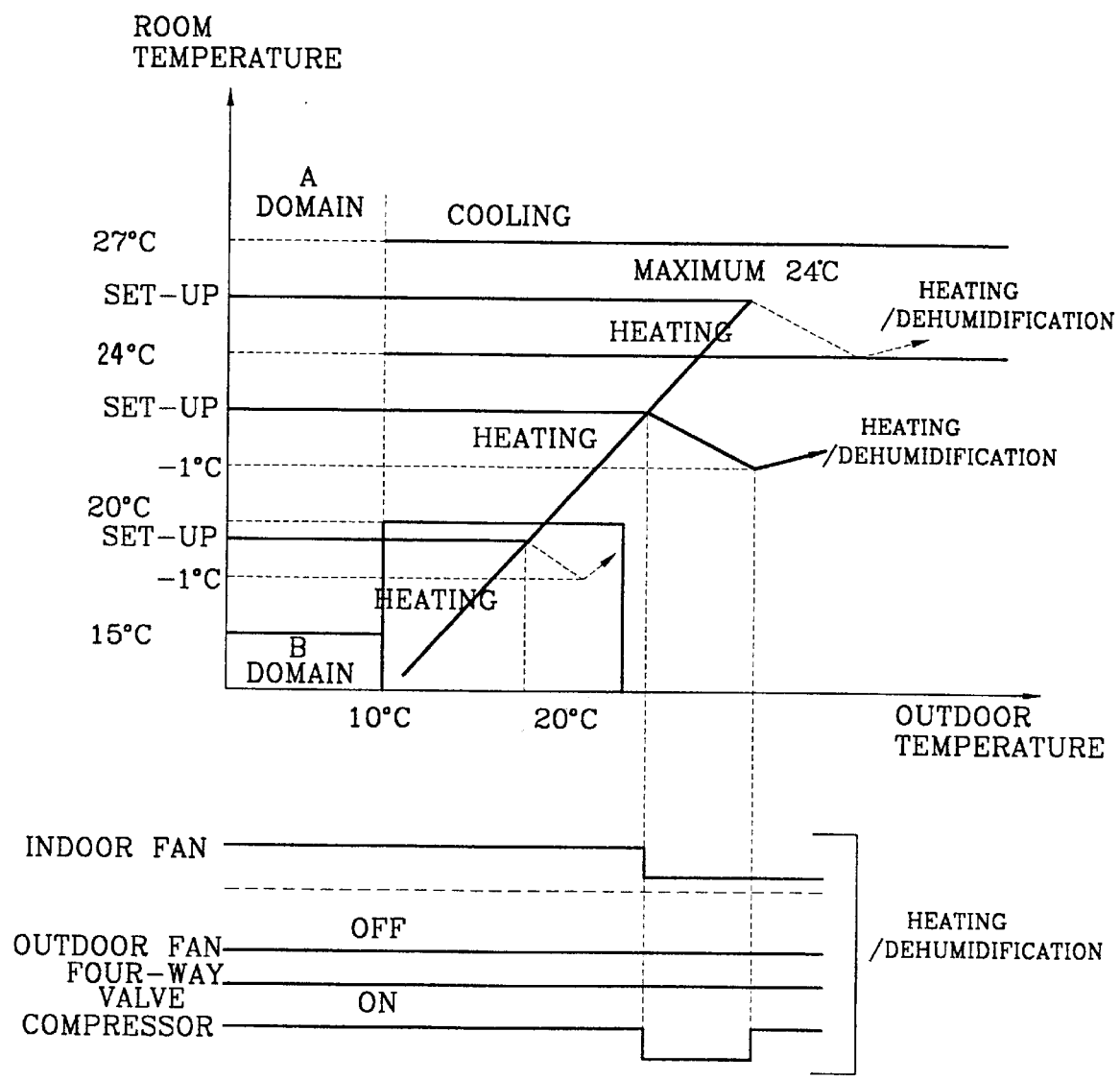
FIG. 5 is an operation pattern domain diagram of an air conditioner according to the present invention when an established temperature is larger than a room temperature.

As a result of the discrimination at step S22, if the Ts<Tr (in case of YES), flow proceeds to step S24 to discriminate whether a difference between Ts and Tr is above 1 degree Celsius, and if the difference is above 1 degree Celsius (in case of YES), flow proceeds to step S25 because, as illustrated in FIG. 5, Ts is above 27 degrees Celsius at Ts>Tr and it corresponds to an operation pattern of dehumidifying mode where the difference between Ts and Tr is 1 degree Celsius, so that, as illustrated in FIG. 8, the outdoor fan 165 and the compressor 30 are turned on, the four-way valve 35 is deactivated for dehumidifying operation and flow returns.

As a result of the discrimination at step S24, if the difference between Ts and Tr is not above 1 degree Celsius (in case of NO), flow proceeds to step S26 to maintain the present state and returns because, as illustrated in FIG. 5, it is an operation pattern of maintaining the difference between Ts and Tr at less than 1 degree Celsius and where the Ts is 27 degrees Celsius at Ts>Tr.

Meanwhile, as a result of the discrimination at step S27, if Ts is not above Tr (in case of NO), flow proceeds to step S29 because it is an operation pattern corresponding to cooling mode where Ts>Tr at Ts being higher than 27 degrees Celsius, as illustrated in FIG. 5. The control means 154 now drives the indoor fan 167 at "strong wind", turn on the outdoor fan 165 and the compressor 30 and turns off the four-way valve 35 for performance of cooling operation and returns.

Furthermore, as a result of the discrimination at step S5, if the Ts is not less than 23 degrees Celsius (in case of NO), flow proceeds to step S31 to discriminate whether the dehumidifying set-up is zero or 1.

If the dehumidifying set-up is 1 (in case of YES), flow advances to step S32 to discriminate whether Tr>Ts. In case of Tr<Ts (in case of NO), flow proceeds to step S33 to perform a detecting operation for dehumidification where the outdoor fan 165, the compressor 30 and the four-way valve 35 are rendered inactive and the indoor fan 167 is driven at the weakest wind, as illustrated in FIG. 8.

As a result of the discrimination at step S32, if Tr>Ts (in case of YES), flow advances to step S34 to discriminate whether a difference between Ts and Tr is above 1 degree Celsius. If the difference is above 1 degree Celsius (in case of YES), flow proceeds to step S35 because, as illustrated in FIG. 6, it is an operation pattern corresponding to dehumidification where Ts is between 23–27 degrees Celsius at Ts<Tr and a difference between Ts and Tr is above 1 degree Celsius. The control means 154 now drives the indoor fan at the weakest wind, turns on the indoor fan 165 and the compressor 30 and turns off the four-way valve for performance of dehumidifying operation and returns, as illustrated in FIG. 8.

As a result of discrimination at step S34, if a difference between Tr and Ts is not above 1 degree Celsius (in case of NO), flow advances to step S36 because, as illustrated in FIG. 6, it is an operation pattern corresponding to maintaining the difference between Tr and Ts at less than 1 degree Celsius and where Ts is between 23–27 degrees Celsius at Ts<Tr, and maintains the present status and returns.

Meanwhile, as a result of discrimination at step S31, if dehumidification set-up is not I but zero (in case of NO), flow proceeds to step S37 to discriminate whether Ts>Tr, and if Ts>Tr (in case of YES), flow advances to step S38 to set-up dehumidification and returns.

As a result of the discrimination at step S37, if Ts is not above Tr (in case of NO), flow proceeds to step S39 to discriminate whether Tr is above 27 degrees Celsius. If Tr>27 degrees Celsius (in case of YES), flow advances to step S40 because, as illustrated in FIG. 6, it is an operation pattern corresponding to cooling mode where Ts is between 23–27 degrees Celsius at Ts<Tr and Tr is above 27 degrees Celsius, to drive the indoor fan 167 at "strong wind", to turn on the outdoor fan 165 and the compressor 30 and to turn off the four-way valve for cooling operation and returns, as illustrated in FIG. 8.

As a result of the discrimination at step S39, if Tr is not above 27 degrees Celsius (in case of NO), flow advances to step S41 because, as illustrated in FIG. 6, it is an operation pattern corresponding to dehumidification, where Ts is between 23–27 degrees Celsius at Ts<Tr and Tr is less than 27 degrees Celsius, and drives the indoor fan 167 at "the weakest wind", turns on the four-way valve 35 for performance of dehumidifying operation and returns.

Meanwhile, as a result of the discrimination at step S3, if the Ts is not below Tr (in case of NO), flow proceeds to step S51 to discriminate whether Ts is below 20 degrees Celsius. If Ts is not below 20 degrees Celsius (in case of NO), flow advances to step S52 to discriminate whether Ts is below 24 degrees Celsius. If Ts in not below 24 degrees Celsius (in case of NO), flow advances to step S53 to forcibly establish Ts at 24 degrees Celsius to a maximum and returns.

As a result of the discrimination at step S52, if Ts is below 24 degrees Celsius (in case of YES), flow proceeds to step S54 to discriminate whether heating/dehumidifying set-up is zero or 1 and if it is 1 (in case of YES), flow advances to step S55 to discriminate whether Ts>Tr. If Ts is not larger than Tr (in case of NO), flow advances to step 556 to turn off the outdoor fan 165, compressor 30 and the four-way valve 35 and drive the indoor fan 165 at "the weakest wind" for performance of detecting operation at dehumidification and returns.

As a result of the discrimination at step 555, if Ts>Tr (in case of YES), flow proceeds to step S57 to discriminate whether a difference between Ts and Tr is over 1 degree Celsius. If it is so (in case of YES), flow advances to step S58 to exercise the heating/dehumidification set-up and returns, because it is an operation pattern corresponding to a heating/dehumidification where Ts is below 24 degrees Celsius at Ts>Tr and difference between Ts and Tr is beyond 1 degree Celsius, as illustrated in FIG. 5.

As a result of the discrimination at step S57, if the difference is not over 1 (in case of NO), flow advances to step S59 to maintain the present status and returns because it is an operation pattern corresponding to maintaining the difference between Tr and Ts under 1 degree Celsius and where Ts is below 24 degrees Celsius at Ts>Tr, as illustrated in FIG. 5.

Meanwhile, as a result of the discrimination at step S54, if the heating/dehumidifying set-up is not I but zero (in case of NO), flow proceeds to step S60 to discriminate whether Tr>Ts, and if Tr>Ts (in case of YES), flow advances to step S61 to reach a heating/dehumidification and returns because it is Ts is below 24 degrees Celsius at Ts<Tr, as illustrated in FIG. 6.

As a result of the discrimination at step S60, if Tr is not over Ts (in case of NO), flow proceeds to step S62 to drive the indoor fan 167 at "strong wind", and to turn on the outdoor fan 165, the compressor 30 and the four-way valve 35 for performance of heating operation and returns as illustrated in FIG. 8, because it is an operation pattern corresponding to heating where Ts is below 24 degrees Celsius at Ts>Tr, as illustrated in FIG. 5.

Meanwhile, as a result of the discrimination at step S51, if the Ts is below 20 degrees Celsius (in case of YES), flow advances to step S71 to discriminate whether dehumidifying/heating set-up is zero or 1, and if it is 1 (in case of YES), flow advances to step S72 to check if Ts>Tr. If Ts is not larger than Tr (in case of NO), flow proceeds to step S73 to turn off the outdoor fan 165, the compressor 30, to turn on the four-way valve and to drive the indoor fan 167 at "the weakest wind" for performance of detecting operation at heating mode and returns, as illustrated in FIG. 8.

As a result of discrimination at step S72, if Ts>Tr (in case of YES), flow advances to step S74 to discriminate whether a difference between Tr and Ts is over 1 degree Celsius, and if the difference is over 1 (in case of YES), flow proceeds to step S75 to perform the heating operation at dehumidification and returns, because it is an operation pattern corresponding to dehumidifying/heating mode where Ts is below 20 degrees Celsius at Ts>Tr and the difference between Ts and Tr is over 1 degree Celsius.

As a result of the discrimination at step S74, if the difference between Ts and Tr is not over 1 degree Celsius (in case of NO), flow proceeds to step S76 to maintain the current status and returns because, as illustrated in FIG. 5, it is an operation pattern corresponding to maintenance of the difference between Ts and Tr at below 1 degree Celsius and where Ts is below 20 degrees Celsius at Ts>Tr.

Meanwhile, as a result of discrimination at step S71, if the dehumidification/heating set-up is not 1 but zero (in case of NO), flow advances to step S70 to discriminate whether Tr<Ts. If Tr<Ts (in case of YES), flow proceeds to step S78 to reach a heating mode at dehumidification and returns because it is a status where Ts is below 20 degrees Celsius at Ts Tr, as illustrated in FIG. 6.

As a result of the discrimination at step S77, if Tr is not over Ts (in case of NO), flow proceeds to step S79 to drive the indoor fan at the "strong wind", to turn on the outdoor fan 165 and the compressor 30 and to turn off the four-way valve 35 for performance of cooling operation and returns, as illustrated in FIG. 8, because it is an operation pattern corresponding to cooling mode where Ts is below 20 degrees Celsius at Ts>Tr.

Now, these series of operations will be described with reference to operation pattern domain diagrams.

Figure 7:
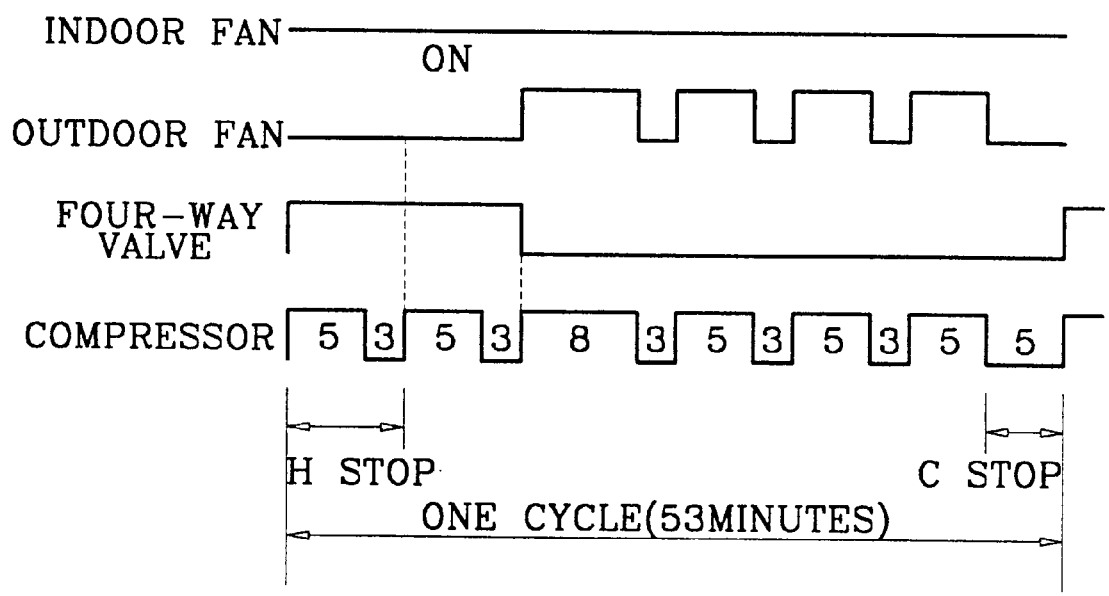
FIG. 7 is an operation pattern domain diagram for heating and dehumidifying in an in conditioner according to the present invention.

First of all, in case Ts>Tr, as illustrated in FIG. 5, a heating operation is executed until Ts is reached when Ts is below 20 degrees Celsius. Detection is started from the time when Ts is reached, detection on the heating operation is performed at Ts of 1 degree Celsius below zero, heating is repeated, and heating operation is executed until the time when Ts is reached when Ts is larger than 20 degree Celsius but less than 24 degrees Celsius. Detection is started from the time when Ts is reached and at Ts of 1 degree below zero, as illustrated in FIG. 7, the heating and dehumidifying operations are exercised to repeat the heating/dehumidifying cycle.

Furthermore, when Ts is larger than 24 degrees Celsius, Ts is forcibly established at 24 degrees Celsius to a maximum and the heating operation is executed until Ts is reached. Detection is started from the time 24 degrees Celsius is reached, and heating/dehumidifying operations are performed at Ts of 1 degree Celsius below zero, as illustrated in FIG. 7 to repeat the heating and dehumidifying cycle. Room temperature detection is disregarded during heating/dehumidifying operations after Ts is reached and the same heating/dehumidifying cycle is repeated, where escape from the heating and dehumidifying operations is only possible by way of an operation deactivation signal from outside key.

Next, when Ts<Tr, as illustrated in FIG. 6, the heating operation is not performed when Ts is less than 20 degrees below and the heating and dehumidifying operations are performed at +1 degree Celsius after Ts is reached. When Ts is less than 23 degrees Celsius, the heating/dehumidifying operations are executed at +1 degree Celsius after Ts is reached, as illustrated in FIG. 7.

When Ts is beyond 23 degrees Celsius but less than 27 degrees Celsius, detection is started from the time when Ts is reached. The dehumidifying operation is performed at Ts of +1 degree Celsius and when Ts is over 27 degrees Celsius, detection starts from the time when Ts is reached and dehumidifying operation is executed at Ts of +1 degree Celsius to repeat the detection and dehumidification. During heating and dehumidification after Ts is reached, the room temperature detection is disregarded to repeat the same heating and dehumidifying cycle, where escape of the heating and dehumidification is only possible by way of the operation deactivation signal from the outside key.

Next, in case Ts=Tr as illustrated in FIG. 6, when Ts is less than 23 degrees Celsius, the heating and dehumidifying operations are executed after Ts is reached at +1 degree Celsius as illustrated in FIG. 7.

When Ts is between 23 and 27 degrees Celsius, detection starts from the time when Ts is reached, and dehumidifying operation starts at Ts of +1 degree Celsius to repeat the detection and dehumidification.

Furthermore, when Ts is over 27 degrees Celsius, detection starts from the time when Ts is reached and dehumidifying operation is performed at Ts of +1 degree Celsius to repeat the detection and dehumidification.

During heating and dehumidifying operation after Ts is reached, the room temperature detection is disregarded to repeat the same heat and dehumidifying cycle, where escape of heating and dehumidification are only possible by way of the operation deactivation signal from outside key.

As apparent from the foregoing, there is an advantage in the dehumidifying control apparatus of an air conditioner and control thereof according to the present invention thus described, in that a heating/dehumidifying operation is performed when a room temperature is lowered by being transformed into heating operation, and when the room temperature reaches a predetermined temperature, the air conditioner is switched to cooling operation to perform a heating/dehumidifying operation, so that heating and cooling operations are inter-switched according to changes of room temperature to keep the room temperature from dropping and to improve dehumidifying efficiency according to increased temperature of the indoor heat exchanger.

What is claimed is:

1. A dehumidifying control apparatus of an air conditioner comprising a cooling/heating mechanism which includes a compressor, an outdoor heat exchanger having an outdoor fan, a capillary tube, and an indoor heat exchanger having an indoor fan, the dehumidifying control apparatus comprising:

a four-way valve arranged to control a direction of flow of refrigerant fluid compressed by the compressor, the valve movable between a heating position for establishing a heating cycle, and a cooling position for establishing a cooling cycle;

room temperature detecting means for detecting a room temperature;

room temperature establishing means for establishing a room temperature;

a user-actuated selector for selecting a humidifying mode of operation; and control means connected to the room temperature detecting means, the room temperature establishing means, the user-actuated selector, and the heating/cooling mechanism for:

comparing a detected room temperature with an established room temperature when a dehumidifying mode is selected by a user, executing a cooling operation, if the detected room temperature is higher than the established room temperature, until the detected room temperature reaches the established room temperature, executing a detecting operation by reducing a speed of the indoor fan and stopping at least one of the outdoor fan and the compressor, beginning when the detected room temperature reaches the established room temperature and ending when the detected room temperature reaches a heating/dehumidifying operation starting temperature which is higher than the established room temperature by a predetermined amount, and executing a heating/dehumidifying operation in response to the detected room temperature reaching the heating/dehumidifying operation starting temperature, wherein the four-way valve is automatically switched between the cooling position and the heating position, and the outdoor fan and the compressor are alternately operated and stopped within a predetermined cycle.

2. A dehumidifying control apparatus of an air conditioner comprising a cooling/heating mechanism which includes a compressor, an outdoor heat exchanger having an outdoor fan, a capillary tube, and an indoor heat exchanger having an indoor fan, the dehumidifying control apparatus comprising:

a four-way valve arranged to control a direction of flow of refrigerant fluid compressed by the compressor, the valve movable between a heating position for establishing a heating cycle, and a cooling position for establishing a cooling cycle;

room temperature detecting means for detecting a room temperature;

room temperature establishing means for establishing a room temperature;

a user-actuated selector for selecting a humidifying mode of operation; and control means connected to the room temperature detecting means, the room temperature establishing means, the user-actuated selector, and the heating/cooling mechanism for:

comparing a detected room temperature with an established room temperature when a dehumidifying mode is selected by a user, executing a heating operation, if the detected room temperature is lower than the established room temperature, until the detected room temperature reaches the established room temperature, executing a detecting operation by reducing a speed of the indoor fan and stopping at least one of the outdoor fan and the compressor, beginning when the detected room temperature reaches the established room temperature and ending when the detected room temperature reaches a heating/dehumidifying operation starting temperature which is lower than the established room temperature by a predetermined amount, and executing a heating/dehumidifying operation in response to the detected room temperature reaching the heating/dehumidifying operation starting temperature, wherein the four-way valve is automatically switched between the cooling position and the heating position, and the outdoor fan and the compressor are alternately operated and stopped within a predetermined cycle.

3. A dehumidifying control method of an air conditioner comprising a cooling/heating mechanism which includes a compressor, an outdoor heat exchanger having an outdoor fan, a capillary tube, an indoor heat exchanger having an indoor fan, a four-way valve arranged to control a direction of flow of refrigerant fluid compressed by the compressor, the valve movable between a heating position for establishing a heating cycle and a cooling position for establishing a cooling cycle, room temperature detecting means for detecting a room temperature, room temperature establishing means for establishing a room temperature, a user-actuated selector for selecting a humidifying mode of operation, and control means connected to the room temperature detecting means, the room temperature establishing means, the user-actuated selector, and the heating/cooling mechanism, the method comprising the steps of:

A) detecting a room temperature;

B) determining whether a dehumidifying mode is selected by a user;

C) comparing the detected room temperature with an established room temperature when the dehumidifying mode is selected;

D) executing a cooling operation, if the detected room temperature is higher than the established room temperature selected by a user, until the detected room temperature reaches the established room temperature;

E) executing a first detecting operation wherein a speed of the in door fan is reduced and at least one of the outdoor fan and compressor is stopped, beginning when the detected room temperature reaches the established room temperature as a result of the cooling operation of step D, and ending when the detected room temperature reaches a first heating/dehumidifying operation starting temperature which is higher than the established room temperature by a predetermined amount;

F) executing a first heating/dehumidifying operation in response to the detected room temperature reaching the first heating/dehumidifying operation starting temperature during step E, wherein the four-way valve alternates between a cooling cycle and a heating cycle, and the outdoor fan and the compressor are alternately operated and stopped within a predetermined cycle;

G) executing a heating operation, if the detected room temperature is lower than the established room temperature in step C until the detected room temperature reaches the established room temperature;

H) executing a second detecting operation wherein a speed of the indoor fan is reduced and at least one of the outdoor fan and the compressor is stopped in response to the detected room temperature reaching the established room temperature during step G, the second detecting operation terminating in response to the detected room temperature reaching a second heating/dehumidifying operation starting temperature which is lower than the established room temperature by a predetermined amount; and I) executing a second heating/dehumidifying operation in response to the detected room temperature reaching the second heating/dehumidifying operation starting temperature during step H, wherein the four-way valve alternates between a cooling cycle and a heating cycle, and the outdoor fan and the compressor are alternately operated and stopped within a predetermined cycle.

4. The method according to claim 3 wherein steps F and I are varied depending upon a relationship between at least one reference temperature and the established room temperature selected by a user.

5. The method according to claim 4 wherein step F is performed with an initial weak heating operation for a predetermined period, followed by a cooling operation for a predetermined period, when the established room temperature is below a predetermined reference temperature.

6. The method according to claim 4 wherein step D utilizes a weak cooling operation when the established temperature is above a predetermined reference temperature.

7. The method according to claim 4 wherein step I is performed with an initial weak heating operation for a predetermined period, followed by a cooling operation for a predetermined period when the established room temperature is above a predetermined reference temperature.

8. The method according to claim 4 wherein step G utilizes a strong heating operation when the established room temperature is below a predetermined reference temperature.

* * * * *